United States Patent [19]

Coggins

[11] 3,907,609

[45] Sept. 23, 1975

[54] CONVERSION COATING FOR TITANIUM AND TITANIUM BASE ALLOYS

[75] Inventor: Dolphus Larry Coggins, Berkeley, Mo.

[73] Assignee: McDonnell Douglas Corporation, St. Louis, Mo.

[22] Filed: Feb. 14, 1974

[21] Appl. No.: 442,478

[52] U.S. Cl. .................... 148/6.2; 106/14; 134/3; 134/40; 134/41; 156/18; 252/79.3; 252/182
[51] Int. Cl.² ..................... C23C 1/10; C23F 7/24
[58] Field of Search ............... 148/6.14 R, 6.16, 6.2; 117/49, 132; 106/14, 286, 306; 156/18; 134/3, 40, 41; 252/79.2, 79.3, 101, 182, 188.3, 193

[56] References Cited
UNITED STATES PATENTS
3,706,603   12/1972   Vessey et al. .................. 148/6.2

*Primary Examiner*—William A. Powell
*Attorney, Agent, or Firm*—Lieder & Woodruff Gravely

[57] ABSTRACT

This application discloses a chemical conversion process and composition for producing an adherent conversion coating on titanium and its alloys. The composition comprises a combination of sodium hydroxide and a hexavalent chromium compound. The process comprises the treatment of the titanium part with the usual, well-known nitric-hydrofluoric acid solution and/or an alkaline cleaner to obtain a clean surface. Then the parts are exposed to the process of this application which produces a surface resulting in increased adhesion or retention of subsequently applied coatings such as chemical milling maskants, adhesive bonding materials, lubricants, other protective coatings, and enhances the adhesion of composite materials to titanium.

10 Claims, No Drawings

CONVERSION COATING FOR TITANIUM AND TITANIUM BASE ALLOYS

REFERENCE TO PRIOR APPLICATIONS

This process and product are useful in the processes described in U.S. Pat. No. 3,788,914 issued Jan. 29, 1974 in the name of John Gumbelevicius and Ser. No. 355,765 filed, Apr. 30, 1973, in the name of Coggins and Werkema, both assigned to the assignee of this invention.

BACKGROUND OF THE INVENTION

This invention relates to the metal coating art, and has particular reference to a process and composition for treating the surfaces of titanium, titanium alloys, and other refractory metals to permit subsequent application of coatings such as adhesive bonding materials, paints, and chemical milling maskants.

Titanium and titanium alloys are finding increasing uses and applications in the aircraft industry, particularly as a substitute for aluminum. Many surface finishing and bonding techniques which are widely used in the manufacture of aluminum and other common metal parts cannot easily be used with titanium and titanium base alloys. This difficulty results from the formation of oxide films on the titanium metal, which provide unsatisfactory surfaces for adhesive bonding material, adherence of paints and lubricants, and the like.

Titanium conventionally is prepared for the application of coatings by cleaning the surface of the titanium part with an organic solvent or alkaline cleaner, and then immersing the part in a nitric-hydrofluoric acid bath. This treatment removes oxides from the surfaces of the titanium parts; however, re-oxidation occurs rapidly upon removal of the part from the reducing bath. I have discovered that the combination of sodium hydroxide and a hexavalent chromium compound results in a titanium conversion coating composition which has significant advantages over conventional titanium coating compositions.

The composition of this invention is an improvement over the conventional coating compositions in that it will produce a surface which will provide superior adhesion of subsequent coatings normally applied in fabricating titanium and titanium alloy particles. The conversion coating of this invention provides optimum line definition of chemical milling maskants without grit blasting or liquid honing. The adhesive bonding strength is increased by 15 to 20 percent and the durability by 248 percent as compared to the conventional processes such as the "Pasa-Jell" method of preparing titanium surfaces for adhesive bonding.

SUMMARY OF THE INVENTION

The present invention comprises a chemical conversion coating solution for titanium and its alloys and other refractory metals with improved adhesion and retention of various coatings and bonding materials. The solution comprises sodium hydroxide and hexavalent chromium compounds.

DETAILED DESCRIPTION

In practicing the present invention, titanium and titanium base alloys are prepared for surface processing by immersing the metal parts in an alkali metal and hexavalent chromium compound solution to form a protective oxide coating that prevents further oxidation of the surface and insures an improved bond strength with subsequent coatings. A thin, adherent complex oxide film is formed by the reaction mechanism of the alkali metal and chromium compounds to improve the bond strength.

There are several reactions which occur in the formation of the conversion coating of this invention. The first reaction taking place when the titanium part is immersed in the solution is the formation of either a titanium hydroxide or a sodium titanate. This compound is converted to a titanium oxide, or to a mixture of oxides, by the oxidizing action of the chromate ions present in the solution. This oxide film prevents further attack on the base titanium metal by sodium hydroxide or by air when it is removed from the solution.

The conversion coating solution includes about 100 to about 500 g/l of an alkali metal hydroxide, preferably sodium hydroxide. Preferably, about 275 g/l NaOH is used. The solution also includes about 1 to about 60 g/l of hexavalent chromium ions from a compound selected from a group consisting of sodium chromate ($Na_2Cr_2O_7$), potassium dichromate ($K_2CrO_7$), chromic oxide ($CrO_3$) and other suitable chromium compounds. Preferably, the chromium compound concentration is such as to provide about 10 grams per liter of the chromium ion.

This corresponds to a range of about 9 to about 36 percent by weight, based on the weight of solution, of the alkali metal hydroxide and from about 0.08 to about 6 percent by weight, based on the weight of the solution, of hexavalent chromium ions. Subsequent to the cleaning and rinsing of the titanium part, it is immersed in the foregoing described solution for about ½ to about 20 minutes. The solution is heated, prior to the immersion of the titanium part, from about 75° to about 250°F., preferably about 215°F. Thereafter, the titanium part is removed from the solution rinsed and dried. The titanium surface produced by this process is inert to re-oxidization, when exposed to air. The coating produces a surface that provides superior adhesion of subsequent coatings normally applied in fabricating titanium and titanium alloy articles.

The constituents wide range and the varied temperatures (from about 75° to about 250°F.) in which the conversion coating composition works, enables one to produce a surface on titanium and titanium alloy articles exhibiting almost any desired degree of adhesion or retention required for protective coatings. The variations in operating temperatures and the different alloys tends to produce conversion coatings of various colors.

The particular color has no effect on the properties of the conversion coat; however, in a production application, the color can be used as a visual control to help determine if a particular article has been properly processed. The color generally varies from purple to brownish red with various shades in between. The colors formed can be used as a decorative finish, thus eliminating a subsequent anodizing or other process for adding color to the metal.

Prior to the application of the conversion coating the articles must be cleaned. For this purpose the usual cleaning procedures are employed. The titanium or titanium alloy article is immersed in a hot, heavy duty alkaline cleaner such as Turco 5578 or solvent (liquid or vapor) cleaner to remove oil, grease, and other contaminants. If needed, the article is further cleaned in nitric-hydrofluoric pickle solution to remove oxides and to provide a clean surface. Both, alkaline cleaning and the pickle in nitric-hydrofluoric solution may be replaced by simple liquid honing, grit blasting or any other suitable cleaning procedure. The main purpose is to obtain a clean surface for application of the invented conversion coating.

EXAMPLE NO. 1

General All-Purpose Procedures for Conversion Coating

The following is a specific detailed disclosure of a preferred process for conversion coating of titanium or titanium base alloys.

1. The titanium or titanium alloy article is cleaned in a standard processing solution consisting of about 30 percent by weight nitric acid (40° Be), about 1.5 percent by weight of 70 percent hydrofluoric acid, and water. The specimen is immersed in this standard processing solution for about 3 minutes. The solution is heated to about 110°F.

The purpose of cleaning is to remove surface oxides and other contaminants usually found imbedded on the surface due to rolling and other fabrication procedures and thus provide a clean surface for the oxide film formation.

2. After the cleaning of the specimen it is immersed in water tanks for rinsing.

3. The clean specimen wet or dry is transferred into the chemical conversion coating solution. The solution composition is as follows:

| | |
|---|---|
| Sodium hydroxide | 22% |
| Chromic Oxide | 2% |
| Water | 76% |

The temperature of the solution is 215°F. The specimen is suspended in the solution using stainless steel wire or basket and is left in the solution for 5 minutes.

4. After the 5 minutes the treated specimen is dried and then it is ready for further processing such as painting, bonding or masking for chemical milling.

EXAMPLE NO. 2

The following is a detailed disclosure of a preferred process of conversion coating for titanium or titanium base alloys as used for adhesive bonding.

1. The specimens of titanium are loaded into a stainless steel basket and are degreased by being immersed in a suitable solvent, such as 1—1—1 trichloroethane, for 5 minutes.

2. After the specimens are free of grease and oil they are either immersed in a heavy duty type alkaline cleaner (preferably sodium or potassium hydroxide at four lbs./gal. for 10 minutes at 210°F.) or they are mechanically abraided by grit blasting or liquid honing; in either case cleaning is accomplished by metal being removed, after which the specimens are thoroughly rinsed before proceeding to the next step.

The purpose of this cleaning is two-fold,
a. to remove oil, grease, finger prints, and other contaminants to provide a clean surface for the formation of the conversion coating.
b. to provide a somewhat rougher surface for the bonding materials.

3. The clean (wet or dry) specimens are transferred into the chemical conversion coating solution. The solution composition, by weight, is as follows:

| | |
|---|---|
| Sodium hydroxide | 22% |
| Chromic Oxide | 2% |
| Water | 76% |

The temperature of the solution is 215°F. The specimens are suspended in the solution using stainless steel wire or basket and are left in the solution for 6 minutes.

4. After the 6 minutes the specimen are removed, rinsed in tap water and then in demineralized water.

5. When rinsing is complete, the specimens are placed in a forced air oven and dried at 220°F. for 30 minutes.

6. The specimens now have an oxide film or coating capable of providing superior adhesion to any subsequent coating applied in fabricating titanium and titanium alloys, especially that of adhesive bonding. In our tests the specimens were bonded using primer BR 400 and adhesive FM 400 from the American Cyanamid Company. A number of specimens so bonded were tested for tensile strength and were found to average about 4000 psi. which is about 20 percent higher than those bonded after being prepared by the Pasa-Jell process. Eight other specimens were prepared for bonding, four by the conversion coating process, and four by the Pasa-Jell process. After bonding the specimen were subjected to a durability test as follows:

The specimens were stressed to 1500 psi at 160°F. and exposed to 100 percent relative humidity until failure.

The specimens prepared by the Pasa-Jell process lasted for an average of 450 hours. The specimen prepared by the invented conversion coating process failed at an average of 1,120 hours. Thus, durability has been increased by a factor of 2.48 or 248 percent.

The conversion coating of this invention has a wide selection of properties that are extremely useful in the manufacture of titanium and titanium alloy articles. In particular, the coating has many applications in the aerospace industry in processes where it is necessary to protect titanium parts in various environmental conditions.

This invention is intended to cover all changes and modifications of the examples of the invention herein chosen for purposes of disclosure, which do not constitute departures from the spirit and scope of the invention.

What is claimed is:

1. A solution for treating the surfaces of articles of titanium and titanium base alloys so that coatings will effectively bond to the surfaces thereof consisting essentially of:
   A. about 9 to about 36 percent by weight of an alkali metal hydroxide;
   B. about 0.08 to about 6 percent by weight of hexavalent chromium ions; and
   C. water.

2. The composition of claim 1 wherein said alkali metal hydroxide is sodium hydroxide.

3. The composition of claim 1 wherein said hexavalent chromium ions came from a compound selected from a group consisting of sodium dichromate, potassium dichromate, various chromic oxides, zinc chromate, copper chromate and chromium acetate and mixtures thereof.

4. A method of treating the surfaces of articles of titanium and titanium base alloys so that coatings will effectively bond to the surfaces thereof, which comprises contacting said articles with a solution consisting essentially of:
- A. about 9 to about 36 percent by weight of an alkali metal hydroxide; and
- B. about 0.08 to about 6 percent by weight of a hexavalent chromium compound.

5. The method of claim 4 wherein said articles are immersed in said solution for about ½ to about 20 minutes.

6. The method of claim 4 wherein said solution is maintained at about 75° to about 250°F.

7. A method of treating the surfaces of articles of titanium and titanium base alloys so that coatings will effectively bond to the surfaces thereof comprising the steps of
- A. cleaning the article,
- B. immersing the cleaned articles surface in a composition consisting essentially of:
  1. about 9 to about 36 percent by weight of an alkali metal hydroxide;
  2. about 0.08 to about 6 percent by weight of a hexavalent chromium compound.

8. The method of claim 7 wherein said articles are immersed in said solution of about ½ to about 30 minutes.

9. The method of claim 7 wherein said solution is maintained at about 75° to about 250°F.

10. The method of claim 9 wherein the cleaning solution is a nitric-hydrofluoric acid bath comprising about 20 to about 50 percent by weight nitric acid (40° Be) and about 1 to about 10 percent by weight of 70 percent hydrofluoric acid.

* * * * *